United States Patent
Chen et al.

(10) Patent No.: US 10,306,201 B2
(45) Date of Patent: May 28, 2019

(54) SHARING OF MOTION VECTOR IN 3D VIDEO CODING

(71) Applicant: Nokia Technologies Oy, Espoo (FI)

(72) Inventors: Ying Chen, San Diego, CA (US); Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/979,121

(22) Filed: May 14, 2018

(65) Prior Publication Data

US 2018/0262742 A1 Sep. 13, 2018

Related U.S. Application Data

(63) Continuation of application No. 13/124,641, filed as application No. PCT/FI2009/050834 on Oct. 16, 2009, now Pat. No. 9,973,739.

(Continued)

(51) Int. Cl.
*H04N 13/106* (2018.01)
*H04N 19/103* (2014.01)
(Continued)

(52) U.S. Cl.
CPC ......... *H04N 13/106* (2018.05); *H04N 13/128* (2018.05); *H04N 19/103* (2014.11);
(Continued)

(58) Field of Classification Search
CPC ....... H04N 19/00781; H04N 19/00278; H04N 19/00545; H04N 19/00884;
(Continued)

(56) References Cited

U.S. PATENT DOCUMENTS

| | | | |
|---|---|---|---|
| 7,009,606 B2 * | 3/2006 | Hiraga | G06T 13/00 345/421 |
| 2007/0030356 A1 | 2/2007 | Yea et al. | |

(Continued)

FOREIGN PATENT DOCUMENTS

| | | | | |
|---|---|---|---|---|
| WO | WO-2007/047736 | | 4/2007 | |
| WO | WO-2007047736 A2 * | | 4/2007 | ........... H04N 19/597 |
| WO | WO-2009/091383 | | 7/2009 | |

OTHER PUBLICATIONS

Bourge et al., "ISO/IEC CD 23002-3 Auxiliary Video Data Representation", Video Group, ISO/IEC JTC 1/SC 291WG 11/N8038, Information technology—MPEG video technologies—Part 3: Auxiliary video data representation, Apr. 11, 2006, pp. 1-.23.

(Continued)

*Primary Examiner* — Farhan Mahmud
(74) *Attorney, Agent, or Firm* — Alston & Bird LLP

(57) ABSTRACT

Joint coding of depth map video and texture video is provided, where a motion vector for a texture video is predicted from a respective motion vector of a depth map video or vice versa. For scalable video coding, depth map video is coded as a base layer and texture video is coded as an enhancement layer(s). Inter-layer motion prediction predicts motion in texture video from motion in depth map video. With more than one view in a bitstream (for multi-view coding), depth map videos are considered monochromatic camera views and are predicted from each other. If joint multiview video model coding tools are allowed, inter-view motion skip is used to predict motion vectors of texture images from depth map images. Furthermore, scalable multiview coding is utilized, where inter-view prediction is applied between views in the same dependency layer, and inter-layer (motion) prediction is applied between layers in the same view.

12 Claims, 8 Drawing Sheets

Related U.S. Application Data

(60) Provisional application No. 61/106,503, filed on Oct. 17, 2008.

(51) Int. Cl.
*H04N 19/196* (2014.01)
*H04N 19/597* (2014.01)
*H04N 19/513* (2014.01)
*H04N 19/30* (2014.01)
*H04N 19/61* (2014.01)
*H04N 13/128* (2018.01)

(52) U.S. Cl.
CPC .......... *H04N 19/196* (2014.11); *H04N 19/30* (2014.11); *H04N 19/513* (2014.11); *H04N 19/597* (2014.11); *H04N 19/61* (2014.11); *H04N 2213/003* (2013.01)

(58) Field of Classification Search
CPC ....... H04N 19/00321; H04N 19/00533; H04N 19/00769
See application file for complete search history.

(56) References Cited

U.S. PATENT DOCUMENTS

| | | |
|---|---|---|
| 2008/0089412 A1 | 4/2008 | Ugur et al. |
| 2010/0020871 A1 | 1/2010 | Hannuksela et al. |
| 2010/0046635 A1 | 2/2010 | Pandit et al. |

OTHER PUBLICATIONS

Grewatsch et al., "Sharing of motion vectors in 3D video coding", Proceedings of 2004 IEEE International Conference on Image Processing (ICIP), Oct. 24-27, 2004, pp. 3271-3274.

Hewage et al., "Comparison of Stereo Video Coding Support in MPEG-4 MAC, H.264/AVC and H.264/SVC", Proceedings of the 4th IET International Conference on Visual Information Engineering (VIE'2007), Jul. 25-27, 2007, pp. 1-6.

Merkle et al., "Efficient compression of multi-view depth data based on MVC", IEEE Proceedings of 3DTV Conference, 2007, May 7-9, 2007, 4 pages.

Oh et al., "H.264-Based Depth Map Sequence Coding UsingMotion Information of Corresponding Texture Video", Advances in Image and Video Technology, Lecture Notes in Computer Science, 2006, pp. 898-907.

Ophir et al., "Wi-Fi (IEEE 802.11) and Bluetooth Coexistence: Issues and Solutions", 2004, pp. 847-852.

Pourazad et al., "An H.264-based video encoding scheme for 3DTV", Proceedings of 14th European Signal Processing Conference (EUSIPCO 2006), Sep. 4-8, 2006, 5 pages.

Redert, et al., "ATTEST: Advanced Three-Dimensional Television System Technologies", Proceedings of the First International Symposium on 3D Data Processing Visualization and Transmission (3DPVT'02), Jun. 19-21, 2002, pp. 313-319.

Series H: Audiovisual and Multimedia Systems Infrastructure of Audiovisual Services—Coding of Moving Video, Advanced Video Coding for Generic Audiovisual Services, H.264, ITU-T, Telecommunication Standardization Sector of ITU, Nov. 2007, pp. 1-564.

Tsung et al., "Multiview video hybrid coding system with texture-depth synthesis", Proceedings of 2008 IEEE International Conference on Multimedia and Expo (ICME 2008), Jun. 23-26, 2008, pp. 1581-1584.

Vetro et al., "Joint Draft 7.0 on Multiview Video Coding", Joint Video Team (JVT) of ISO/IEC MPEG & ITU-T VCEG (ISO/IEC JTC1/SC29/WG11 and ITU-T SG16 0.6), JVT-AA209, 27th Meeting, Apr. 23-29, 2008, 55 pages.

Vetro et al., "Joint Draft 8.0 on Multiview Video Coding", Joint Video Team (JVT) of ISO/IEC MPEG & ITU-T VCEG (ISO/IEC JTC1/SC29/WG11 and ITU-T SG16 0.6), JVT-AB204, 28th Meeting, Jul. 20-25, 2008, pp. 1-63.

Vetro et al., "Joint Multiview Video Model (JMVM) 8.0", Joint Video Team (JVT) of ISO/IEC MPEG & ITU-T VCEG (ISO/IEC JTC1/SC29/WG11 and ITU-T SG16 0.6), JVT-AA207, 27th Meeting, Apr. 23-29, 2008, pp. 1-20.

Weigand et al., "Joint Draft ITU-T Rec. H.264 I ISO/IEC 14496-10/ Amd.3 Scalable video coding", Joint Video Team (JVT) of ISO/IEC MPEG & ITU-T VCEG (ISOIIEC JTC1/SC29/WG11 and ITU-T SG16 Q.6), JVT-X201, 24th Meeting, Jun. 29-Jul. 5, 2007, 563 pages.

Wu et al., "Improved methods for object-based coding of plenoptic videos", Proceedings of 2005 IEEE International Symposium on Intelligent Signal Processing and Communication Systems, Dec. 13-16, 2005, pp. 481-484.

International Search Report received for corresponding Patent Cooperation Treaty Application No. PCT/FI2009/050834, dated Mar. 23, 2010, 17 pages.

International Preliminary Report on Patentability received for corresponding Patent Cooperation Treaty Application No. PCT/FI2009/ 050834 dated Apr. 28, 2011, 10 pages.

Extended European Search Report received for corresponding European Patent Application No. 09820314.4, dated Jul. 12, 2012, 7 pages.

Office Action for European Application No. 09 820 314 .4 dated Mar. 21, 2013.

Office Action for European Application No. 09 820 314.4 dated Nov. 14, 2013.

Office Action for Chinese Application No. 200980151318.7 dated Feb. 19, 2014.

Office Action for European Application No. 09 820 314 .4 dated Jun. 6, 2014.

Final Office Action for U.S. Appl. No. 13/124,641 dated Mar. 23, 2015, 13 pages.

Office Action for U.S. Appl. No. 13/124,641 dated Aug. 27, 2014, 13 pages.

Notice of Allowance for U.S. Appl. No. 13/124,641 dated Jan. 11, 2018.

Office Action for India Application No. 3251/CHENP/2011 dated Dec. 26, 2017, 6 pages.

\* cited by examiner

SHARING OF MOTION VECTOR IN 3D VIDEO CODING

CROSS-REFERENCE TO RELATED APPLICATIONS

This application is a continuation of U.S. application Ser. No. 13/124,641, filed May 26, 2011, which is a national phase entry of International Application No. PCT/FI2009/050834, filed Oct. 16, 2009, which claims priority to U.S. Provisional Application No. 61/106,503, filed Oct. 17, 2008, the entire contents of which are incorporated herein by reference.

FIELD

Various embodiments relate generally to video coding three-dimensional (3D) video content where depth map images are present. More specifically, various embodiments relate to joint optimization of multiview video and depth to enable high coding efficiency.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC Moving Picture Experts Group (MPEG)-1 Visual, ITU-T H.262 or ISO/IEC MPEG-2 Video, ITU-T H.263, ISO/IEC MPEG-4 Visual and ITU-T H.264 (also know as ISO/IEC MPEG-4 Advanced Video Coding (AVC)). In addition, there have been efforts with regards to the development of new video coding standards. One such standard is the scalable video coding (SVC) standard, which is the scalable extension to H.264/AVC. Another such standard which is just finalized, is the multiview video coding (MVC) standard, which becomes another extension to H.264/AVC.

In multiview video coding, video sequences output from different cameras, each corresponding to different views, are encoded into one bit-stream. After decoding, to display a certain view, the decoded pictures belonging to that view are reconstructed and displayed. It is also possible for more than one view to be reconstructed and displayed.

Multiview video coding has a wide variety of applications, including free-viewpoint video/television, 3D TV, and surveillance applications. Currently, the Joint Video Team (JVT) of ISO/IEC Motion Picture Expert Group (MPEG) and ITU-T Video Coding Expert Group is working to develop a MVC standard, which is becoming an extension of H.264/AVC. These standards are referred to herein as MVC and AVC, respectively. The latest working draft of MVC is described in JVT-AB204, "Joint Draft Multi-view Video Coding," 28th JVT meeting, Hannover, Germany, July 2008, available at ftp3.itu.ch/av-arch/jvt-site/2008_07_Hannover/JVT-AB204.zip.

Besides the features defined in the working draft of MVC, other potential features, particularly those focusing on coding tools, are described in the Joint Multiview Video Model (JMVM). The latest version of JMVM is described in JVT-AA207, "Joint Multiview Video Model (JMVM) 8.0," 24th JVT meeting, Geneva, Switzerland, April 2008, available at ftp3.itu.ch/av-arch/jvt-site/2008_04_Geneva/JVT-AA207.zip.

FIG. 1 is a representation showing a conventional MVC decoding order (i.e., bitstream order). The decoding order arrangement is referred to as time-first coding. Each access unit is defined to contain the coded pictures of all the views (e.g., S0, S1, S2, . . . ) for one output time instance (e.g., T0, T1, T2, . . . ). It should be noted that the decoding order of access units may not be identical to the output or display order. A conventional MVC prediction (including both inter-picture prediction within each view and inter-view prediction) structure for multi-view video coding is shown in FIG. 2. In FIG. 2, predictions are indicated by arrows, with each pointed-to object using the respective point-from object for prediction reference.

An anchor picture is a coded picture in which all slices reference only slices with the same temporal index, i.e., only slices in other views and not slices in earlier pictures of the current view. An anchor picture is signaled by setting the anchor_pic_flag to 1. After decoding the anchor picture, all following coded pictures in display order can be decoded without inter-prediction from any picture decoded prior to the anchor picture. If a picture in one view is an anchor picture, then all pictures with the same temporal index in other views shall also be anchor pictures. Consequently, the decoding of any view can be started from a temporal index that corresponds to anchor pictures. Pictures with an anchor_pic_flag equal to 0 are referred to as non-anchor pictures.

In the Joint Draft of MVC, view dependencies are specified in the sequence parameter set (SPS) MVC extension. The dependencies for anchor pictures and non-anchor pictures are independently specified. Therefore, anchor pictures and non-anchor pictures can have different view dependencies. However, for the set of pictures that refer to the same SPS, all of the anchor pictures must have the same view dependency, and all of the non-anchor pictures must have the same view dependency. In the SPS MVC extension, dependent views can be signaled separately for the views used as reference pictures in RefPicList0 and RefPicList1. Within one access unit, when view component A directly depends on view component B, this means that view component A uses view component B for inter-view prediction. If view component B directly depends on view component C, and if view component A does not directly depend on view component C, then view component A indirectly depends on view component C.

In the Joint Draft of MVC, there is also an inter_view_flag in the network abstraction layer (NAL) unit header which indicates whether the current picture is used for inter-view prediction for the pictures in other views. In this draft, inter-view prediction is supported by only texture prediction, i.e., only the reconstructed sample values may be used for inter-view prediction, and only the reconstructed pictures of the same output time instance as the current picture are used for inter-view prediction. After the first byte of the NAL unit (NALU), an NAL unit header extension (3 bytes) follows. The NAL unit header extension includes the syntax elements that describe the properties of the NAL unit in the context of MVC.

As a coding tool in JMVM, motion skip predicts macroblock (MB) modes and motion vectors from the inter-view reference pictures and it applies to non-anchor pictures only. During encoding, a global disparity motion vector (GDMV) is estimated when encoding an anchor picture, and GDMVs for non-anchor pictures are then derived so that the GDMVs for a non-anchor picture is a weighted average from the GDMVs of the two neighboring anchor pictures. A GDMV is of 16-pel precision, i.e., for any MB in the current picture (i.e. the picture being encoded or decoded), the corresponding region shifted in an inter-view reference picture according to the GDMV covers exactly one MB in the inter-view reference picture.

Based on this GDMV, for each non-anchor picture, the GDMV is scaled. For each MB, if the MB utilizes motion skip, a local offset of the disparity motion vector is signaled. At the decoder, if motion skip mode is used, the final disparity motion vector is used to find the motion vectors in the inter-view pictures and the motion vectors are copied from the inter-view pictures.

3D video has recently garnered significant interest. Furthermore, with advances in acquisition and display technologies, 3D video is becoming a reality within the consumer domain via the use of different application opportunities. Given a certain maturity of capture and display technologies, and with the help of MVC techniques, a number of different envisioned 3D video applications are becoming more feasible. It should be noted that 3D video applications can be generally grouped into three categories: free-viewpoint video; 3D TV (video); and immersive teleconferencing. The requirements of these applications can be quite different and realizing each type of 3D video application has its own challenges.

When transmitting 3D content based on 2D images, the bandwidth constraint becomes an issue, and thus a powerful compressor is required to code the 3D content with only a reasonable number of views. However, at a client device, for example, a user may require the experience of viewing the 3D content at any angle, e.g., with view navigation or auto-stereoscopic video. Therefore, it is desirable for a decoder to render as many views as possible and to do so as continuously as possible. View synthesis can address this bandwidth constraint by transmitting a reasonable number of views while interpolating other views at the renderer. Within the MPEG video subgroup, Exploration Experiments in 3D Video Coding (3DV EE) are being performed to study a similar application scenario. It is also claimed that having depth map videos for each view is potentially helpful for view synthesis.

Furthermore, MPEG has also specified a format for attaching a depth map for a regular video stream in MPEG-C part 3. This specification is described within "Text of ISO/IEC FDIS 23002-3 Representation of Auxiliary Video and Supplemental Information," N8768 of ISO/IEC JTC 1/SC 29/WG 11, Marrakech, Morocco, January 2007.

In MPEG-C part 3, a so-called auxiliary video can be either a depth map or a parallax map. A texture video typically consists of three components, namely one luma component Y, and two chroma components U and V, whereas a depth map only has one component representing the distance between an object pixel and the camera. Generally, a texture video is represented in YUV 4:2:0, 4:2:2 or 4:4:4 format, where one chroma sample (U or V) is coded for each 4, 2, or 1 luma sample, respectively. A depth map is regarded as luma-only video in YUV 4:0:0 format. Depth maps can be inter-coded similarly to inter-coded luma-only texture pictures, and hence coded depth maps can have motion vectors. When representing a depth map, it provides flexibilities in terms of the number of bits used to represent each depth value. For example, the resolution of the depth map can be, for example, ¼ the width and ½ the height of an associated image).

It should be noted that determining which video codec is used is an application issue, although the end result is to be able to, e.g., code the depth map video as a monochromatic video (4:0:0). For example, the depth map can be coded as an H.264/AVC bitstream with only a luminance component. Alternatively, the depth map can be coded as an auxiliary video defined in H.264/AVC. In H.264/AVC, auxiliary pictures are coded independently of the primary pictures, and hence there is no prediction between the primary coded pictures for sample values and the auxiliary coded pictures for depth values.

View synthesis for 3D video rendering is improved when depth information for each picture of a view (i.e., depth map video) is provided. Because a depth map video can consume a large part of the whole bandwidth for an entire bitstream (especially when each view is associated with a depth map), the coding of depth map video should be efficient enough to save the bandwidth.

Generally and as described above, depth map videos, if existent, are coded independently. However, correlations can exist between a texture video and its associated depth map. For example, the motion vectors in a coded depth map and those in a coded texture video could be similar. It can be foreseen that sample prediction between depth map and texture is inefficient and almost useless but motion prediction between depth map images and texture images is beneficial.

For multiview video content, MVC is the "state-of-art" coding standard. Based on the MVC standard, it is not possible to code depth map videos and texture videos in one MVC bitstream, and in the meantime, enabling motion prediction between depth map images and texture images.

SUMMARY

Various embodiments provide joint coding of depth map video and texture video. In accordance with various embodiments, a motion vector for a texture video is predicted from a respective motion vector of a depth map video or vice versa. An SVC-compliant scenario is contemplated when only one view is present in a bitstream. In this scenario, depth map video is coded as a base layer and texture video is coded as enhancement layer(s). Additionally, inter-layer motion prediction can be used to predict motion in texture video from motion in depth map video. Alternatively, texture video is coded as a base layer, depth map video is coded as an enhancement layer, and motion in depth map is predicted from the motion in texture video. When more than one view is present in a bitstream, the inter-layer prediction between the texture video and the respective depth map video can be applied to each of the views. In another scenario with multiple views, depth map videos are considered to be monochromatic camera views and can be predicted from each other. If JMVM coding tools are allowed, inter-view motion skip can be used to predict the motion vectors of texture images from depth map images. In another scenario, scalable multiview video coding (SMVC) is utilized where inter-view prediction is applied between views in the same dependency layer, and inter-layer (motion) prediction is applied between layers in the same view.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of various embodiments are described by referring to the attached drawings, in which.

DETAILED DESCRIPTION

Figure 1:
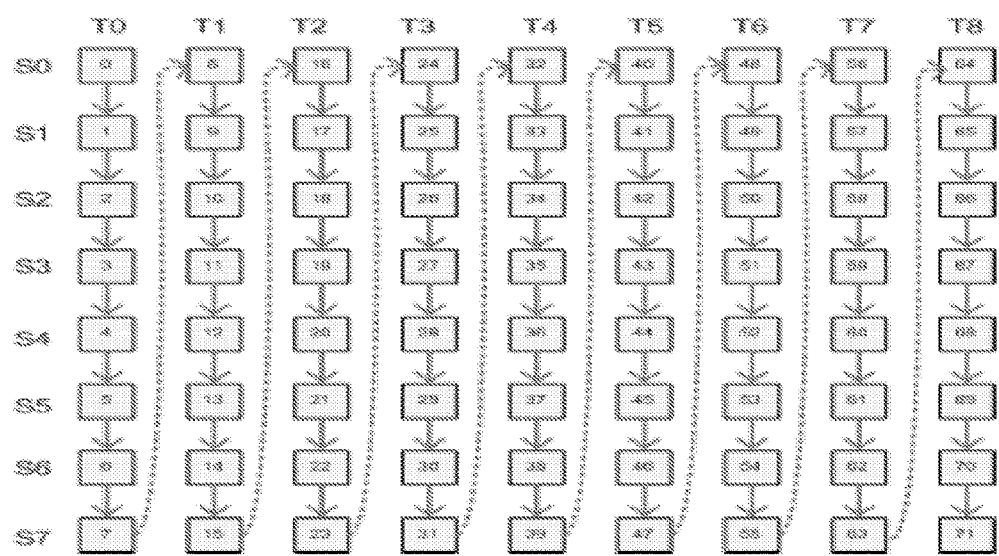
FIG. 1 illustrates a conventional MVC decoding order.
Figure 2:
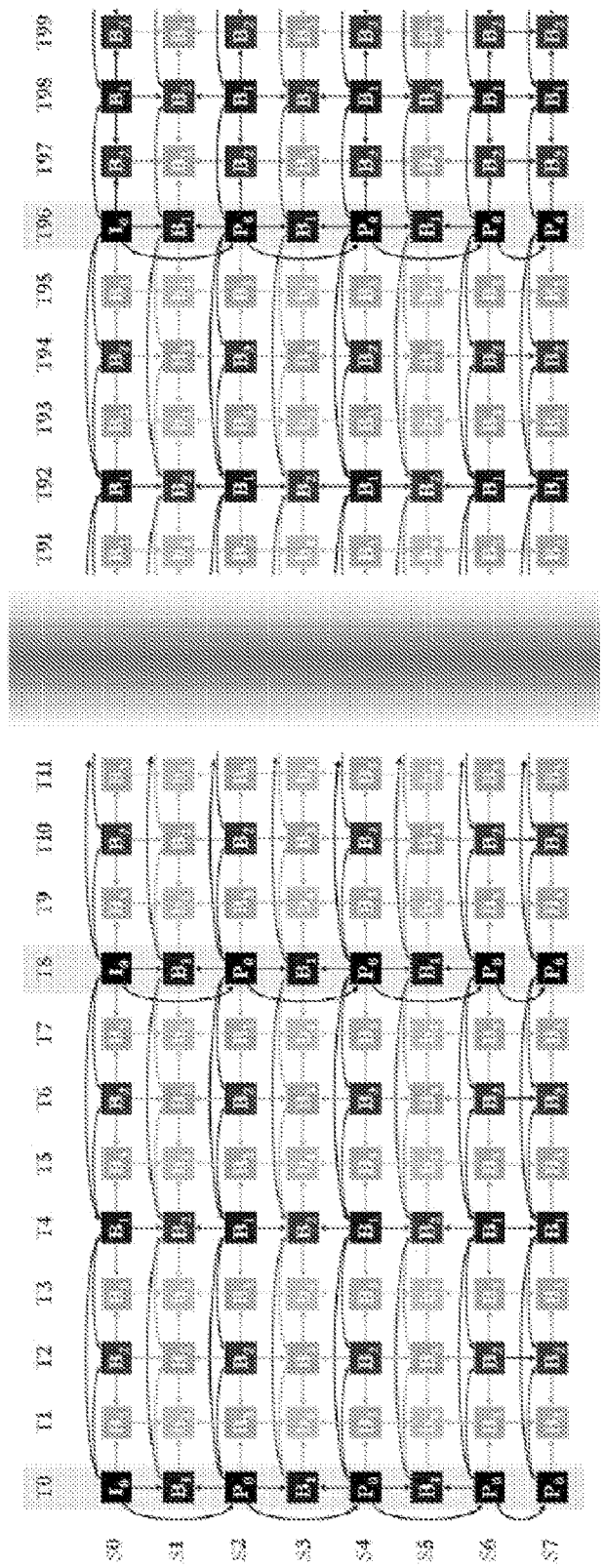
FIG. 2 illustrates an example of a conventional MVC temporal and inter-view prediction structure.
Figure 3:
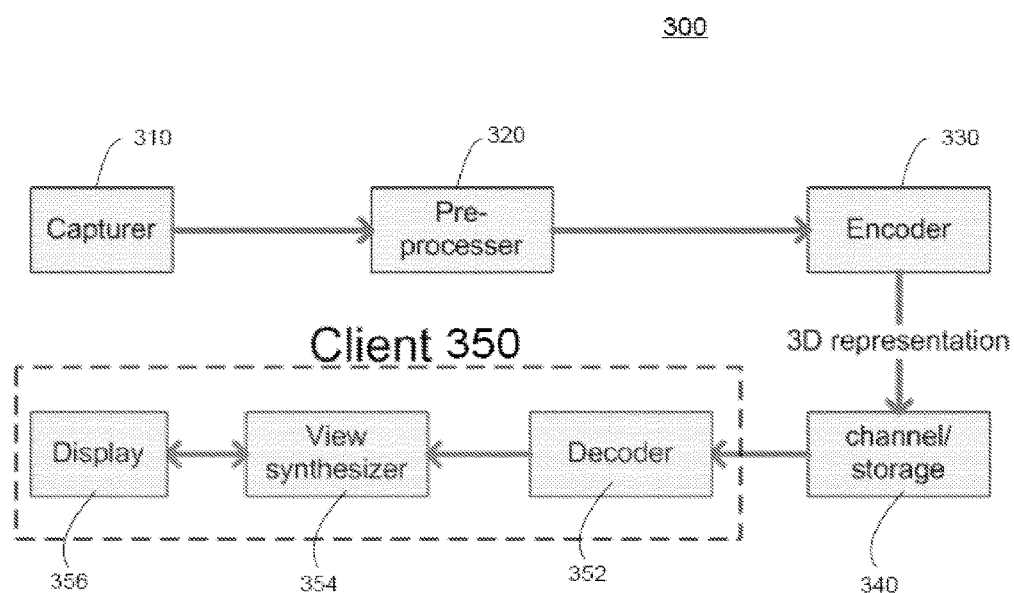
FIG. 3 is a block diagram illustrating exemplary components and an exemplary process flow for a 3D video system.

A 3D video system 300 is shown in FIG. 3. 3D video content is captured as multiple video sequences (N views) at a capturer 310. The capturer 310 may also capture depth for each view or a subset of views, but alternatively or in addition, depth can be estimated in a pre-processor 320. A pre-processor 320 is responsible for geometry rectification and color calibration. Furthermore, the pre-processor 320 may perform depth estimation to associate depth map images to the video sequence(s). At an encoder 330, the video sequences are coded into bitstreams for example, by a MVC encoder. If the content comes with/is associated with depth map images/pictures, they can be coded, e.g., as auxiliary pictures which are supported in H.264/AVC. The compressed 3D representations, namely bitstreams, are transmitted through a specific channel or held in a storage device 340. If the multiview content comes with depth, the coding of depth is required.

When a client 350 receives a bitstream from the channel or storage device 340, A decoder 352 implemented within the client 350 decodes the N views and the depth map images (if any exist). The decoder 352 may also decode a subset of the N views and the depth map images depending on which coded and synthesized views are needed for displaying. A view synthesizer 354 can generate more views (referred to as novel or virtual views) based on the N views and the depth map images using view synthesis algorithms. Additionally, the view synthesizer 354 can interact with a display 356, which, e.g., provides a human interface device, such as a remote controller. It should be noted that the view synthesizer 354 can be integrated into the decoder 352, especially for auto-stereoscopic applications with small viewing angles.

Figure 4:
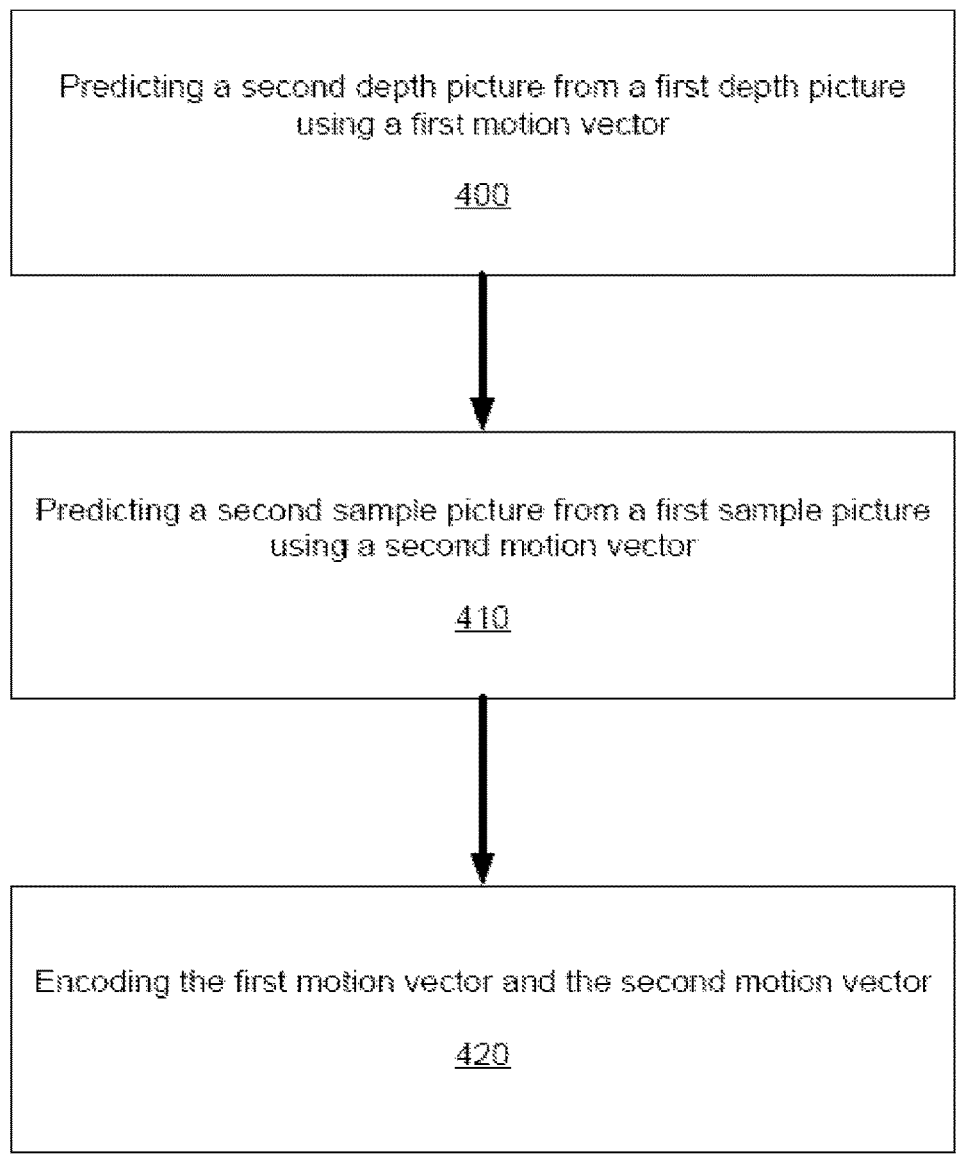
FIG. 4 is a flow chart illustrating exemplary processes performed for encoding a media stream in accordance with various embodiments.

Various embodiments enable joint coding of depth map video and texture video. FIG. 4 is a flow chart illustrating exemplary processes performed for encoding a media stream comprising a first view including a first depth picture, a second depth picture, a first sample picture, and a second sample picture in accordance with various embodiments. At 400, a second depth picture is predicted from a first depth picture using a first motion vector. At 410, a second sample picture is predicted from a first sample picture using a second motion vector. At 420, the first motion vector and the second motion vector are encoded, e.g., jointly. It should be noted that joint encoding can include prediction of the second motion vector from the first motion vector or vice versa, and encoding only the difference of motion vectors into the bitstream.

When only one view is present in a bitstream, an SVC-compliant scenario is contemplated where depth map video is coded as a base layer and texture video is coded as an enhancement layer(s). Additionally, the SVC-compliant scenario uses inter-layer motion prediction to predict motion in texture video from motion in depth map video. In another embodiment, an SVC-compliant scenario is contemplated where texture video is coded as a base layer, depth map video is coded as an enhancement layer, and inter-layer motion prediction is used to predict motion in the depth map. When more than one view is present in a bitstream, the inter-layer prediction between the texture video and the respective depth map can be applied to each of the views. In a scenario with multiple views, depth map videos are considered to be monochromatic camera views and can be predicted from each other. If JMVM coding tools are allowed, inter-view motion skip can be used to predict the motion vectors of texture images from depth map images. In another scenario, SMVC is utilized where inter-view prediction is applied between views in the same dependency layer, and inter-layer (motion) prediction is applied between layers in the same view.

The SVC specification is described in ITU-T Recommendation H.264, "Advanced video coding for generic audio-visual services," 11/2007, available at http://www.itu.int/rec/T-REC-H.264/en.

In SVC, there is an output flag "output_flag" in the NAL unit header SVC extension to specify whether a decoded picture is to be output or not. For a video coding layer (VCL) NAL unit belonging to the AVC compatible base layer, output_flag is included in the associated prefix NAL unit.

SVC also introduces inter-layer prediction for spatial and SNR scalabilities based on texture, residue, and motion. This is a major point of novelty for SVC when compared with other scalable solutions that utilize only inter-layer prediction of texture. This inter-layer prediction provides Macroblock (MB) level adaptation, and it is possible for each MB to perform Rate-Distortion Optimization (RDO) mode decisions between inter-layer prediction and normal intra-layer prediction in the enhancement layer. The spatial scalability in SVC has been generalized into any resolution ratio between two layers, so it is possible to support scalability from a base layer with SDTV (with a picture aspect ratio of 4:3) to an enhancement layer with HDTV (with a picture aspect ratio of 16:9). The SNR scalability is realized by coding an enhancement layer with the same resolution as its base layer for inter-layer prediction, and the enhancement layer is coded by applying a finer Quantization Parameter (QP) to the prediction residue, which is described in greater detail below. Currently, Course Granularity Scalability (CGS) and Medium Granularity Scalability (MGS) are supported for SNR scalability. The difference between MGS and CGS is that MGS allows for the switching of transporting and decoding different MGS layers at any access unit, whereas CGS layers can only be switched at some fixed points where the pictures of the switched-to layer are IDR pictures. Additionally, a more flexible reference mechanism can be used for MGS key pictures to provide a tradeoff between error drift and enhancement layer coding efficiency.

In SVC, inter-layer coding dependency hierarchy for spatial scalability and CGS are identified by the syntax element dependency_id, while MGS dependency hierarchy is identified by the syntax element quality_id. As is done with temporal_id, these two syntax elements are also signaled in the NAL unit header SVC extension. At any temporal location, a picture of a larger dependency_id value may be inter-layer predicted from a picture with a smaller dependency_id value. However, in CGS, at any temporal location and with an identical dependency_id value, a picture with a quality_id value equal to QL can only use the base quality picture with a quality_id value equal to QL−1 for inter-layer prediction. Those quality enhancement layers with a quality_id greater than 0 are MGS layers.

If the enhancement layer has the same resolution as the base layer (i.e., it is a CGS or MGS layer), texture, residue, or motion can be directly used for inter-layer prediction. Otherwise, the base layer is upsampled (for texture or residue) or scaled (for motion) before being used for inter-layer prediction. These inter-layer prediction methods are discussed below.

The coding mode using inter-layer texture prediction is called "IntraBL" mode in SVC. To enable single-loop decoding, only the MBs for which the co-located MBs in the base layer for inter-layer prediction are constrainedly intra-coded can use this mode. A constrainedly intra-coded MB is intra-coded without referring to any samples from the neighboring inter MBs. For spatial scalability, the texture is upsampled based on the resolution ratio between the two layers. In the enhancement layer, the difference between the original signal and the possibly upsampled base layer texture is coded as if it was the motion compensation residue in an inter MB in single-layer coding.

If an MB is indicated to use residual prediction, the co-located MB in the base layer for inter-layer prediction must be an inter MB and its residue may be upsampled according to the resolution ratio. The possibly upsampled residual signal of the base layer is then used for predicting the residue of the enhancement layer. The difference between the residue of the enhancement layer and that of the base layer is coded.

When inter-layer motion prediction is enabled for an MB or MB partition in the enhancement layer, and meanwhile, the reference indices of the base layer and the enhancement layer are the same, the co-located base layer motion vectors may be scaled to generate predictors for the motion vectors of MB in the enhancement layer. There is one MB type named base mode, which sends one flag for each MB. If this flag is true and the corresponding base layer MB is not intra, then motion vectors, partitioning modes and reference indices are all derived from the base layer.

In accordance with the SVC-compliant depth coding scenario, one view with two videos may be considered. The first video may be a texture video that contains texture images. The second video may be a depth map video that contains depth map images. The depth map images can have the same or a lower resolution than the texture images. In such a scenario, a combined scalable method is used to enable the joint coding of the depth and texture images, which operates as follows.

With regard to a base layer, the texture video is coded as 4:2:0 views (or a higher chroma sample format with three color components) and an output_flag equal to 1. As to an enhancement layer, the texture images are coded as 4:0:0 views (with only a luminance component), with an output_flag set to 0. Additionally, CGS or MGS is used in combination with different chroma sample formats if the texture images have the same resolution as the depth map images. Alternatively, spatial scalability is used in combination with different chroma sample formats if the texture images have a higher resolution than the depth map images.

Alternatively and with regard to a base layer, the depth map images are coded as 4:0:0 views (with only a luminance component) and an output_flag equal to 0. As to an enhancement layer, the texture images are coded as 4:2:0 views (or a higher chroma sample format with three color components), with an output_flag set to 1. Additionally, CGS or MGS is used in combination with chroma sample scalability if the texture images have the same resolution as the depth map images. Alternatively, spatial scalability is used in combination with chroma sample scalability if the texture images have a higher resolution than the depth map images.

Moreover, only inter-layer motion prediction is utilized in the previous cases, and IntraBL and residual prediction are disabled. Furthermore, a supplemental enhancement information (SEI) message is signaled to indicate that the SVC bitstream is coded in the manner described above. In H.264/AVC, SVC, and MVC, bitstreams can include SEI messages. SEI messages are not required for the decoding of sample values in output pictures but assist in related processes, such as picture output timing, rendering, error detection, error concealment, and resource reservation. Many SEI messages are specified in H.264/AVC, SVC, and MVC standards, and user data SEI messages enable organizations and companies to specify SEI messages for their own use. H.264/AVC, SVC, and MVC standards contain the syntax and semantics for the specified SEI messages, but no process for handling the messages in the decoder is defined. Consequently, encoders are required to follow the H.264/AVC, SVC, or MVC standard when they create SEI messages, and decoders conforming to the H.264/AVC, SVC, or MVC standard are not required to process SEI messages for output order conformance. One of the reasons to include the syntax and semantics of SEI messages in H.264/AVC, SVC and MVC standards is to allow system specifications to interpret the supplemental information identically and hence inter-operate. It is intended that system specifications can require the use of particular SEI messages both in the encoding end and in the decoding end, and the process for handling SEI messages in the recipient may be specified for the application in a system specification.

From a decoder perspective, if such a message is received, three embodiments are contemplated to get both the depth map video and the texture video. In a first embodiment, multiple-loop decoding is performed, i.e., the base layer and the enhancement layer(s) are fully reconstructed. In accordance with a second embodiment, different subsets of the bitstreams are extracted, and two instances of a single-loop decoder are executed. That is, a bitstream subset containing only the base layer is extracted and then decoded (by a H.264/AVC, SVC, or MVC decoder) to get depth map video first. Subsequently, the entire bitstream is decoded to get the texture video. In accordance with a third embodiment, a single-loop decoder is modified to output a base layer picture selectively, depending on whether the picture is required for display or view synthesis. If a base layer picture is not required for display or view synthesis, conventional single-loop decoding can be used, and the coded base layer picture is merely used as a prediction reference for the respective enhancement layer picture. It should be noted that in accordance with these three embodiments, the depth map images are reconstructed only for those views that take part in view synthesis.

Various mechanisms/schemes have been proposed to use SVC for each view of the MVC content. For example, a MVC scheme has been proposed where each view is coded with a SVC scheme implemented as a MVC extension of the SVC standard. The features of these proposed schemes include a codec design that enables any view in a multiview bitstream to be coded in a scalable fashion. A reference picture marking design and reference picture list construction design are provided to enable the use of any dependency representation from any other view earlier in view order than the current view for inter-view prediction. Additionally and for the dependency representation used for inter-view prediction, the proposed reference picture marking design and reference picture list construction design allows for selective use of base representation or enhancement representation of the dependency representation for inter-view prediction. The enhancement representation of a dependency representation may result from decoding of a MGS layer representation or a fine grain scalability (FGS) layer representation. In accordance with this proposed Scalable Multiview Video Coding (SMVC) scheme, the fields in the NAL unit header of SVC and the fields in the NAL unit header of multiview are included in the NAL unit head of SMVC. For example, view_id, dependency_id are present in a NAL unit header of SMVC.

Figures 5A, 5B, 5C, 5D:
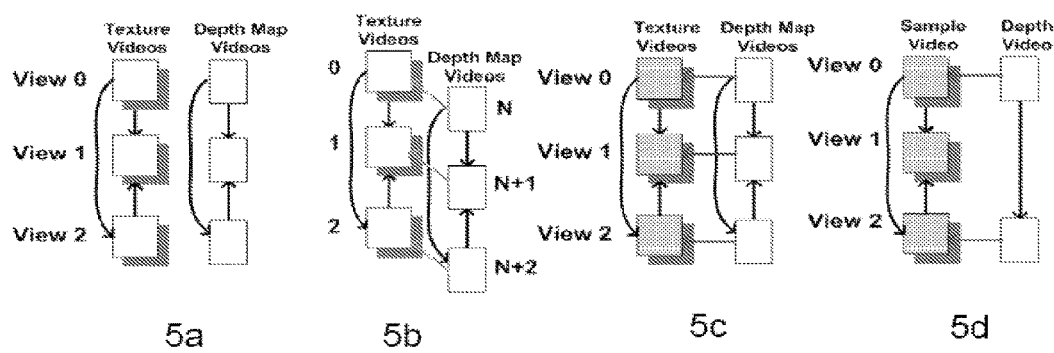
FIGS. 5a-5d are representations of various MVC scenarios for 3D content with depth and texture videos coding/decoding in accordance with various embodiments.

Thus, for multiple-view bitstreams, a MVC-compliant depth coding scenario is contemplated. When multiple views exist, each of which is with a depth map video and a texture video, MVC-compliant depth coding can be applied to enable inter-view prediction between depth map videos and inter-view prediction between texture videos. One manner of coding the multiview content is in an MVC-compliant manner. In accordance with a first embodiment, all of the depth map images are coded as auxiliary pictures while enabling inter-view prediction (indicated by the arrows) between auxiliary pictures in different views, as shown in FIG. 5a. For example, FIG. 5a illustrates that a depth map video from view 1 can utilize depth map videos from views 0 and 2 as prediction references.

In accordance with a second embodiment, all of the depth map images are coded as normal 4:0:0 views while each of the depth map videos is assigned a new view identifier. For example and as shown in FIG. 5b, considering a scenario with three views, the texture videos are coded as views 0 to 2, and the depth map videos are coded as views N, N+1 and N+2. Inter-view motion prediction between depth map video and texture video in each view is applied in this embodiment. It should be noted that motion skip applied in JMVM (indicated by the diagonal arrows between each of the depth map and texture videos) do not take effect in this embodiment. The remaining arrows illustrated in FIG. 5b are again indicative of inter-view prediction. In this case, an SEI message is introduced to enable a renderer to map the view identifier of the depth map to its associated texture video. In FIG. 5b, the inter-view motion prediction is from depth map video to texture video, alternatively, inter-view motion prediction can be done from the texture video to depth map.

In a JMVM-compliant depth coding scenario, motion prediction can be enabled between the depth map video and the texture video of the same view. This scenario is shown with reference to FIG. 5b again. However, in this JMVM scenario, motion skip will take effect. A depth map video is coded as a normal 4:0:0 view while each of the depth map videos is assigned a new view identifier as described above. Motion skip is enabled from the depth map video to the texture video if they belong to the same view. In this case, global disparity is always signaled as 0 and local disparity for an MB is also always signaled as 0 (if motion skip mode is used). As a result, encoder complexity can be reduced. Alternatively, motion skip can also be enabled from the texture video to the depth map while still signaling the global disparity and local disparity as 0. In this case, an SEI message is introduced to enable the renderer to map the view identifier of the depth map to its associated texture video. It should be noted that to enable this scenario, a depth map video and a texture video should have the same resolution if they are associated with each other. Alternatively, the motion skip process can also be performed from the texture video to depth map video instead of from depth map video to texture video.

FIG. 5c illustrates a SMVC depth coding scenario where each view has two dependency layers. In accordance with one embodiment, a lower dependency layer corresponds to an MVC-compliant base layer, which is coded with H.264/AVC coding tools as well as inter-view prediction. The base layer of each view corresponds to the depth map video of a specific view and is coded with a monochromatic mode. The higher dependency layer of each view is coded with H.264/AVC coding tools, inter-view prediction from the other views that share the same dependency layer, and inter-layer motion prediction from the base layer of the same view (indicated by the arrows from the depth map videos to the texture videos of the various views). This layer is an MVC dependency layer which corresponds to the texture video of a specific view. If the texture images have a higher resolution than the depth map images, spatial scalability is used in combination with different chroma sample formats.

Alternatively and in accordance with another embodiment, a lower dependency layer corresponds to an MVC-compliant base layer, which is coded with H.264/AVC coding tools as well as inter-view prediction. The base layer corresponds to the texture video of a specific view. The higher dependency layer of each view is coded with a monochromatic mode, utilizing H.264/AVC coding tools, inter-view prediction from the other views that share the same dependency layer, and inter-layer motion prediction from the base layer of the same view (indicated by the arrows from the depth map videos to the texture videos of the various views). This layer is an MVC dependency layer which corresponds to the depth map video of a specific view.

It should be noted that full decoding of depth map (base layer or the enhancement layer) in each view for view synthesis is required. Full decoding of the texture video (highest layer or base layer) for desired camera views (that are to be displayed) is required.

Alternatively still, yet another embodiment implementing depth coding in SMVC can be applied where certain views are coded with depth map video while some views are coded without depth map video, as shown in FIG. 5d. In this case, some views, e.g., view 1, have only one dependency layer (the texture video) while other views can have two dependency layers (the depth map as well as the texture video). Moreover, this embodiment can also utilize inter-layer prediction within one view from texture video to depth map video.

With respect to FIG. 4 and as described above, in a first embodiment, the media stream can be an SVC bitstream with a base layer comprising the first and second depth pictures, where the second motion vector is predicatively coded (e.g., using inter-layer motion prediction) on the basis of the first motion vector. Alternatively, in a second embodiment, the media stream can be an SVC bitstream with a base layer comprising the first and second sample pictures, where the first motion vector is predicatively coded (e.g., using inter-layer motion prediction) on the basis of the second motion vector. Additionally, the base layer (in the first embodiment) or an enhancement layer (in the second embodiment) is coded as monochromatic video, where an enhancement layer is coded as a MGS, CGS, or spatial enhancement layer. It should be noted that the base layer (in the first embodiment) or the enhancement layer (in the second embodiment) is indicated "not targeted for output," where an SEI message is encoded to indicate that the media stream comprises a base layer of depth map images (in the first embodiment). The SEI message can also be encoded to indicate that the media stream comprises an enhancement layer of depth map images (in the second embodiment).

As also described above, the media stream can include a second view including depth pictures and sample pictures, where a third depth picture in the second view is encoded and inter-view prediction is used between the second depth picture and the third depth picture. In this embodiment, the depth pictures can be coded as auxiliary pictures.

In another embodiment, the disparity motion between the first coded view containing depth map images and the second coded view containing texture images is indicated to be zero and the inter-view motion skip mode is used for the predictive coding of the second motion vector.

The bitstream format of the various scenarios indicated above are described herein. For SVC-compliant depth coding, an example of the SEI message syntax to indicate that the SVC is coded with joint depth and texture video is as follows.

```
joint_depth_coding_SVC(payloadSize) {
    view_info_pre_flag                     5    u(1)
    if ( view_info_pre_flag )
        view_id                            5    ue(v)
}
```

This SEI message, if present, indicates that the coded SVC bitstream has one or more dependency layers (depth map video) of a 4:0:0 format, and from the two dependency layers which have different chroma sampling formats, only inter-layer motion prediction is allowed. The semantics of an SVC joint depth coding SEI message includes a "view_info_pre_flag" that when equal to 1, indicates that the view identifier to which this SVC bitstream corresponds is specified. A "view_info_pre_flag" equal to 0 indicates that a view identifier is not specified. Additionally, a "view_id" indicates the view identifier of a view which the decoded video and depth map correspond to.

For one embodiment described above associated with MVC-compliant depth coding scenarios, the syntax of an exemplary MVC depth view identifier mapping SEI message is as follows:

```
depth_id_map_mvc(payloadSize) {
    num_depth_views_minus1                              5    ue(v)
    for( i=0; i<=num_depth_views_minus1; i++ ) {
        sample_view_id[i]                               5    ue(v)
        depth_view_id[i]                                5    ue(v)
    }
}
```

The MVC depth view identifier mapping SEI message semantics include a "num_depth_views_minus1" parameter that indicates the number of views that are coded with depth map video. Additionally, a "sample_view_id[i]" parameter indicates the view_id of the texture video of the i-th view that is coded with a depth map video. Furthermore, "depth_view_id[i]" indicates the view_id of the depth map video of the i-th view that is coded with a depth map video.

When considering JMVM-compliant depth coding scenarios, an exemplary SEI message syntax can be the same as that described above for MVC-compliant depth coding. With regard to mapping SEI message semantics, like the semantics of a MVC depth_view identifier mapping SEI message, the following is included: a "num_depth_views_minus1" parameter that indicates the number of views that are coded with depth map video; a "sample_view_id[i]" parameter that indicates the view_id of the texture video of the i-th view that is coded with a depth map video, and "depth_view_id[i]" which indicates the view_id of the depth map video of the i-th view that is coded with a depth map video. Additionally, when present, the bitstream enables motion skip from the depth map video and texture video with a view identifier pair of "depth_view_id[i]" and "sample_view_id[i]". The signaled disparity motion from a view with a "view_id" value equal to a "depth_view_id[i]" value to the view with a "view_id" value equal to the "sample_view_id[i]" value is set to zero.

As to SMVC depth coding, the relevant syntax allows a base layer to have a dependency_id that is not equal to 0 in order to enable inter-view prediction from texture videos (with the same dependency_id value) in different views, when one view does not have depth while the other does have depth.

It should be further understood that, although text and examples contained herein may specifically describe an encoding process, one skilled in the art would understand that the same concepts and principles also apply to the corresponding decoding process and vice versa. For example and with regard to FIG. 4, a decoder may decode and encoded media stream having the properties described above which are achieved by the prediction of a second depth picture and second sample picture from a first depth picture and first sample picture, respectively, using a first and second motion vector, where the motion vectors have been, e.g., jointly encoded.

Figure 6:
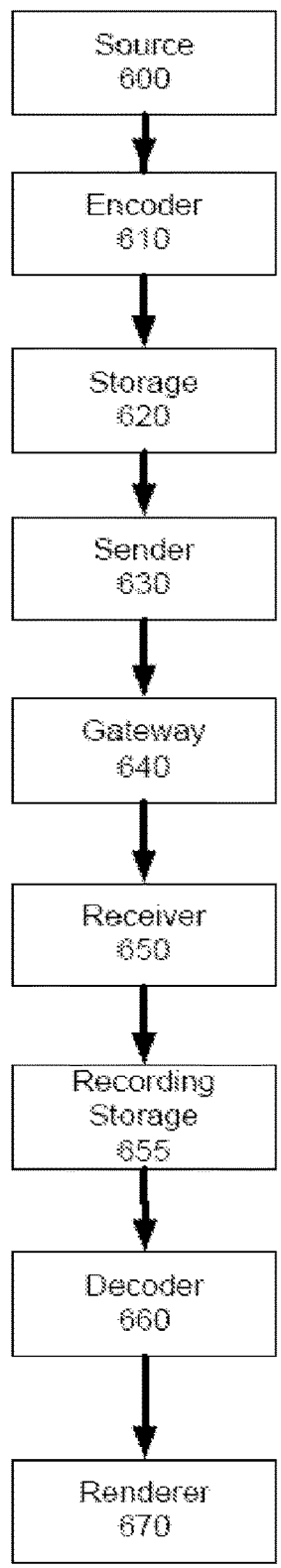
FIG. 6 is a representation of a generic multimedia communications system for use with various embodiments of the present invention.

FIG. 6 is a graphical representation of a generic multimedia communication system within which various embodiments may be implemented. As shown in FIG. 6, a data source 600 provides a source signal in an analog, uncompressed digital, or compressed digital format, or any combination of these formats. An encoder 610 encodes the source signal into a coded media bitstream. It should be noted that a bitstream to be decoded can be received directly or indirectly from a remote device located within virtually any type of network. Additionally, the bitstream can be received from local hardware or software. The encoder 610 may be capable of encoding more than one media type, such as audio and video, or more than one encoder 610 may be required to code different media types of the source signal. The encoder 610 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 6 only one encoder 610 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 620. The storage 620 may comprise any type of mass memory to store the coded media bitstream. The format of the coded media bitstream in the storage 620 may be an elementary self-contained bitstream format, or one or more coded media bitstreams may be encapsulated into a container file. Some systems operate "live", i.e. omit storage and transfer coded media bitstream from the encoder 610 directly to the sender 630. The coded media bitstream is then transferred to the sender 630, also referred to as the server, on a need basis. The format used in the transmission may be an elementary self-contained bitstream format, a packet stream format, or one or more coded media bitstreams may be encapsulated into a container file. The encoder 610, the storage 620, and the server 630 may reside in the same physical device or they may be included in separate devices. The encoder 610 and server 630 may operate with live real-time content, in which case the coded media bitstream is typically not stored permanently, but rather buffered for small periods of time in the content encoder 610 and/or in the server 630 to smooth out variations in processing delay, transfer delay, and coded media bitrate.

The server 630 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 630 encapsulates the coded media bitstream into packets. For example, when RTP is used, the server 630 encapsulates the coded media bitstream into RTP packets according to an RTP payload format. Typically, each media type has a dedicated RTP payload format. It should be again noted that a system may contain more than one server 630, but for the sake of simplicity, the following description only considers one server 630.

The server 630 may or may not be connected to a gateway 640 through a communication network. The gateway 640 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 640 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 640 is called an RTP mixer or an RTP translator and typically acts as an endpoint of an RTP connection.

The system includes one or more receivers 650, typically capable of receiving, de-modulating, and de-capsulating the transmitted signal into a coded media bitstream. The coded media bitstream is transferred to a recording storage 655. The recording storage 655 may comprise any type of mass memory to store the coded media bitstream. The recording storage 655 may alternatively or additionally comprise computation memory, such as random access memory. The format of the coded media bitstream in the recording storage 655 may be an elementary self-contained bitstream format, or one or more coded media bitstreams may be encapsulated into a container file. If there are multiple coded media bitstreams, such as an audio stream and a video stream, associated with each other, a container file is typically used and the receiver 650 comprises or is attached to a container file generator producing a container file from input streams. Some systems operate "live," i.e. omit the recording storage 655 and transfer coded media bitstream from the receiver 650 directly to the decoder 660. In some systems, only the most recent part of the recorded stream, e.g., the most recent 10-minute excerpion of the recorded stream, is maintained in the recording storage 655, while any earlier recorded data is discarded from the recording storage 655.

The coded media bitstream is transferred from the recording storage 655 to the decoder 660. If there are many coded media bitstreams, such as an audio stream and a video stream, associated with each other and encapsulated into a container file, a file parser (not shown in the figure) is used to decapsulate each coded media bitstream from the container file. The recording storage 655 or a decoder 660 may comprise the file parser, or the file parser is attached to either recording storage 655 or the decoder 660.

The coded media bitstream is typically processed further by a decoder 660, whose output is one or more uncompressed media streams. Finally, a renderer 670 may reproduce the uncompressed media streams with a loudspeaker or a display, for example. The receiver 650, recording storage 655, decoder 660, and renderer 670 may reside in the same physical device or they may be included in separate devices. It should be noted that the bitstream to be decoded can be received from a remote device located within virtually any type of network. Additionally, the bitstream can be received from local hardware or software.

A sender 630 according to various embodiments may be configured to select the transmitted layers or views for multiple reasons, such as to respond to requests of the receiver 650 or prevailing conditions of the network over which the bitstream is conveyed. A request from the receiver can be, e.g., a request for a change of layers or views for display or a change of a rendering device having different capabilities compared to the previous one.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 7:
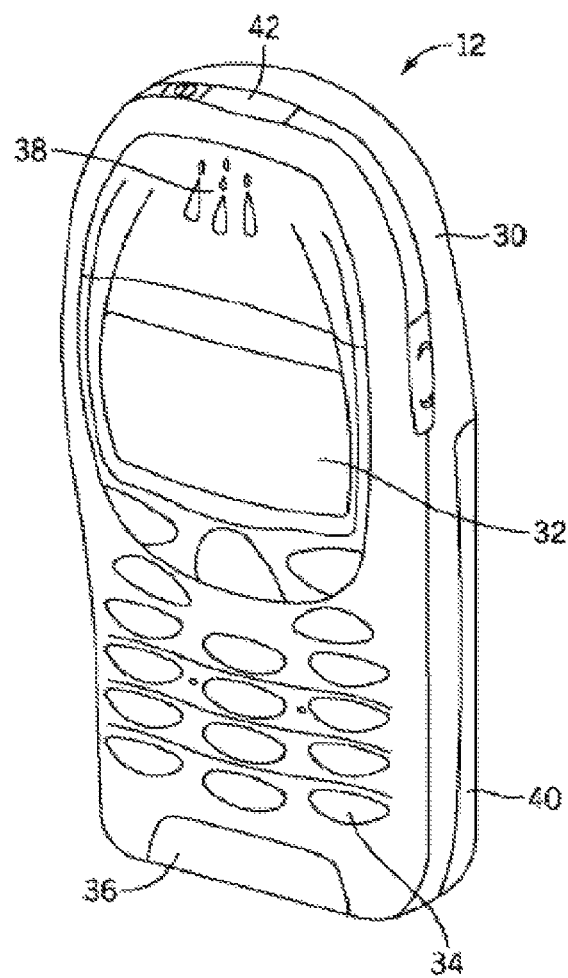
FIG. 7 is a perspective view of an electronic device that can be used in conjunction with the implementation of various embodiments of the present invention.
Figure 8:
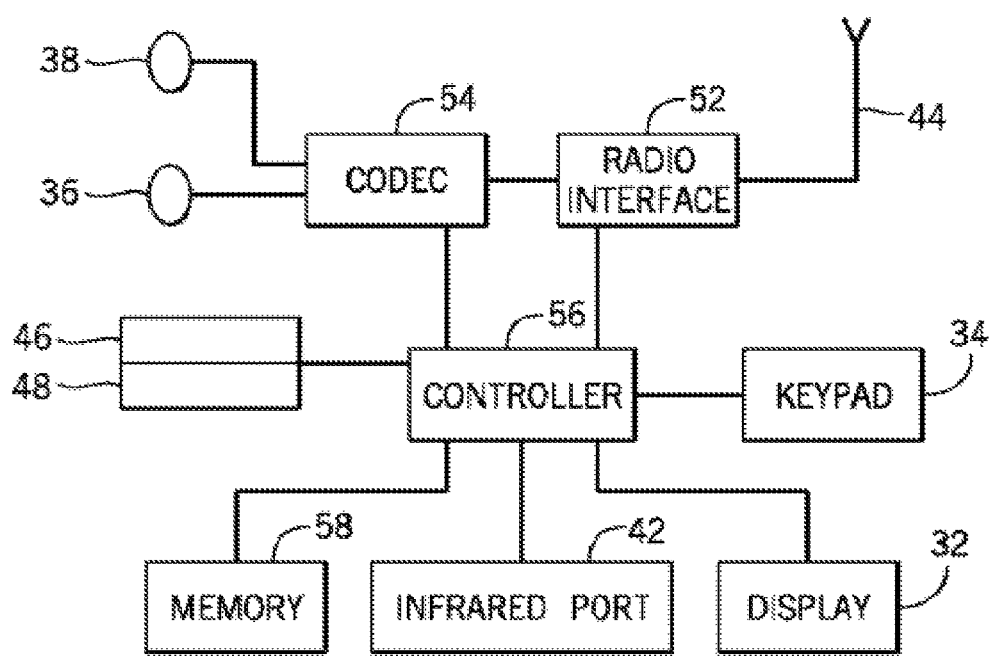
FIG. 8 is a schematic representation of the circuitry which may be included in the electronic device of FIG. 4.

FIGS. 7 and 8 show one representative electronic device 12 within which various embodiments may be implemented. It should be understood, however, that various embodiments are not intended to be limited to one particular type of device. The electronic device 12 of FIGS. 7 and 8 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Various embodiments may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit various embodiments to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize various embodiments and with various modifications as are suited to the particular use contemplated. The features of the embodiments described herein may be combined in all possible combinations of methods, apparatus, modules, systems, and computer program products.

What is claimed is:

1. A method for encoding a bitstream including a first texture picture, a first depth map picture associated with the first texture picture, a second texture picture, a second depth map picture associated with the second texture picture, and a third texture picture, wherein the first depth map picture belongs to a first view and the second depth map picture belongs to a second view and the first depth map picture and the second depth map picture are encoded as auxiliary pictures coded independently of the corresponding texture pictures, the method comprising:
    predicting the second depth map picture from the first depth map picture using a first motion vector;
    predicting the second texture picture from the first texture picture or the third texture picture using a second motion vector;
    predicting the third texture picture from the first texture picture or the second texture picture using a third motion vector; and
    encoding the first motion vector, the second motion vector and the third motion vector into the bitstream.

2. A method of claim 1, wherein encoding the second motion vector comprises encoding a difference between the first motion vector and the second motion vector into the bitstream.

3. A non-transitory computer-readable medium having a computer program stored thereon, the computer program comprising instructions operable to cause a processor to perform the method of claim 1.

4. An apparatus comprising at least one processor and at least one memory including computer program code, the at least one memory and computer program code configured to, with the processor, cause the apparatus to:
    encode a bitstream including a first texture picture, a first depth map picture associated with the first texture picture, a second texture picture, a second depth map picture associated with a second texture picture, and a third texture picture, wherein the first depth map picture belongs to a first view and the second depth map picture belongs to a second view and the first depth map picture and the second depth map picture are encoded as auxiliary pictures coded independently of the corresponding texture pictures;
    predict the second depth map picture from the first depth map picture using a first motion vector;
    predict the second texture picture from the first texture picture or the third texture picture using a second motion vector;
    predict the third texture picture from the first texture picture or the second texture picture using a third motion vector; and
    encode the first motion vector, the second motion vector and the third motion vector into the bitstream.

5. An apparatus of claim 4, wherein the apparatus is caused to encode the second motion vector by encoding a difference between the first motion vector and the second motion vector into the bitstream.

6. A method of decoding a bitstream including a first texture picture, a first depth map picture associated with the first texture picture, a second texture picture, a second depth map picture associated with the second texture picture, and a third texture picture, wherein the first depth map picture belongs to a first view and the second depth map picture belongs to a second view and the first depth map picture and the second depth map picture are auxiliary pictures coded independently of the corresponding texture pictures, the method comprising:
    decoding a first motion vector from a bitstream;
    decoding a second motion vector from the bitstream;
    decoding a third motion vector from the bitstream;
    decoding the second depth map picture, wherein the first motion vector is used to predict the second depth map picture from the first depth map picture;

decoding the second texture picture, wherein the second motion vector is used to predict the second texture picture from the first texture picture or the third texture picture; and decoding the third texture picture, wherein a third motion vector is used to predict the third texture picture from the first texture picture or the second texture picture.

7. A method of claim 6 wherein decoding the second motion vector comprises decoding the second motion vector based on a residual value retrieved from the bitstream.

8. A method of claim 6 wherein decoding the second motion vector comprises decoding the second motion vector by summing a prediction based on the first motion vector and a residual value retrieved from the bitstream.

9. A non-transitory computer-readable medium having a computer program stored thereon, the computer program comprising instructions operable to cause a processor to perform the method of claim 6.

10. An apparatus comprising at least one processor and at least one memory including computer program code, the at least one memory and computer program code configured to, with the processor, cause the apparatus to:

decode a bitstream including a first texture picture, a first depth map picture associated with the first texture picture, a second texture picture, a second depth map picture associated with a second texture picture, and a third texture picture, wherein the first depth map picture belongs to a first view and the second depth map picture belongs to a second view and the first depth map picture and the second depth map picture are auxiliary pictures coded independently of the corresponding texture pictures;

decode a first motion vector from the bitstream;

decode a second motion vector from the bitstream;

decode a third motion vector from the bitstream;

decode the second depth map picture, wherein the first motion vector is used to predict the second depth map picture from the first depth map picture;

decode the second texture picture, wherein the second motion vector is used to predict the second texture picture from the first texture picture or the third texture picture; and decode the third texture picture, wherein a third motion vector is used to predict the third texture picture from the first texture picture or the second texture picture.

11. An apparatus of claim 10 wherein the apparatus is caused to decode the second motion vector by decoding the second motion vector based on a residual value retrieved from the bitstream.

12. An apparatus of claim 10 wherein the apparatus is caused to decode the second motion vector by decoding the second motion vector by summing a prediction based on the first motion vector and a residual value retrieved from the bitstream.

* * * * *